US008776726B2

(12) United States Patent
Hillman

(10) Patent No.: US 8,776,726 B2
(45) Date of Patent: Jul. 15, 2014

(54) PORTABLE PET URINE RESERVOIR

(76) Inventor: Kathleen T. Hillman, Jupiter, FL (US)

( * ) Notice: Subject to any disclaimer, the term of this patent is extended or adjusted under 35 U.S.C. 154(b) by 67 days.

(21) Appl. No.: 13/158,389

(22) Filed: Jun. 11, 2011

(65) Prior Publication Data

US 2012/0312242 A1 Dec. 13, 2012

(51) Int. Cl.
*A01K 1/01* (2006.01)
*A01K 29/00* (2006.01)

(52) U.S. Cl.
USPC ............................................ 119/169; 119/161

(58) Field of Classification Search
USPC .................. 119/161, 163, 165–169
See application file for complete search history.

(56) References Cited

U.S. PATENT DOCUMENTS

| 2,390,854 | A | * | 12/1945 | Thompson | 119/161 |
|---|---|---|---|---|---|
| 3,752,121 | A | * | 8/1973 | Brazzell | 119/169 |
| 3,827,401 | A | * | 8/1974 | Franzl | 119/169 |
| 5,355,837 | A | * | 10/1994 | Reyes | 119/161 |
| 5,494,001 | A | * | 2/1996 | Leibowitz | 119/163 |
| 5,579,722 | A | * | 12/1996 | Yamamoto et al. | 119/169 |
| 5,724,916 | A | * | 3/1998 | Brodie et al. | 119/525 |
| 6,079,363 | A | * | 6/2000 | MacLaine | 119/161 |
| 6,412,442 | B1 | * | 7/2002 | Bean | 119/701 |
| 6,802,281 | B2 | * | 10/2004 | Otsuji et al. | 119/169 |
| 7,434,539 | B2 | * | 10/2008 | Gloor | 119/165 |
| 7,621,233 | B2 | * | 11/2009 | Dukes et al. | 119/165 |
| 2005/0284392 | A1 | | 12/2005 | Hillman | |
| 2008/0251026 | A1 | * | 10/2008 | Bell et al. | 119/168 |

FOREIGN PATENT DOCUMENTS

| WO | WO2006011983 | 2/2006 |
|---|---|---|
| WO | WO2008/089011 | 7/2008 |

* cited by examiner

*Primary Examiner* — David Parsley
(74) *Attorney, Agent, or Firm* — Steven M. Greenberg, Esq.; Kara A. Brotman, Esq.; CRGO Law

(57) ABSTRACT

A portable pet urine reservoir is provided and includes a housing that defines a reservoir with a sloped basin with a plurality of polygonally shaped protrusions upwardly emanating from the basin. The polygonally shaped protrusions are of different heights to allow a permeable pad disposed on top of the polygonally shaped protrusions to lay approximately flat. An aperture disposed in the housing is also provided through which collected urine in the reservoir can be emptied. The portable pet urine reservoir further includes an additional reservoir, an additional basin, and an additional aperture which permits fluid communication between the reservoir and the additional reservoir. The portable pet urine reservoir also includes support structure, which upwardly extends from the additional basin.

20 Claims, 10 Drawing Sheets

PORTABLE PET URINE RESERVOIR

CROSS-REFERENCE TO RELATED APPLICATIONS

This application claims priority to application 29/387,522 filed Mar. 14, 2011 and is hereby incorporated by reference.

BACKGROUND OF THE INVENTION

1. Field of the Invention

The present invention relates to a litter box and more particularly to a portable pet waste disposal station.

2. Description of the Related Art

While pets have long proven worthwhile to many people, pets come at a cost. Aside from food and medical concerns, pets generally evacuate several times each day. By evacuation, it is meant that pets both urinate and defecate. Notably, evacuation merely represents an exercise in impulse for many pets, most are able to be trained so as to evacuate only at certain times and in certain places. Classically, dogs have been trained to evacuate outside at selected times of the day, and cats have been trained to evacuate indoors using a litter box. Interestingly, even less typical pets such as ferrets, rabbits, possums, and such have been trained to utilize a litter box when the need for evacuation arises.

Generally, a litter box consists of an impermeable container filled with absorbent material such as litter, newspaper and such which can absorb urine and which can be disposed of handily. Litter, in particular, has experienced advances in composition over the past two decades and now can serve the function of both an absorbent material and an odor-fighting material. More sophisticated litter boxes have been proposed including ones having a permanent mesh screen for separating urine and fecal matter, but cleaning the mesh screen can be a messy and uncomfortable proposition for pet owners. Even with the advances in litter and litter boxes, it is still possible to track litter from a litter box.

Commercially distributed litter boxes mostly address the requirements of cat and other small pet owners. To that end, owners of large pets, including medium and large breed dogs, have been unable to recognize the conveniences associated with litter box type technologies. Rather, it is presumed that large pet owners are to always "turn out" their dogs when necessary, including in the midst of a thunderstorm, in the middle of the night, or even when a suitable outside is not readily available, such as in the case of a high-rise apartment complex or hotel.

In addition to litter boxes, animal owners have also used puppy pads (or wee pads) to capture pet waste, though puppy pads generally only capture urine. Puppy pads can also be dragged throughout a house by an animal resulting in the further spreading of pet waste. In addition, after a pet uses a puppy pad, the animal's paws can be wet from the urine, allowing the urine to be tracked throughout the house. After each use a puppy pad has to be picked-up by the owner, carried to a trash can, and thrown away forcing the pet owner to come in contact with the pet waste, and thus, increasing the chances of the pet owner being exposed to illness. In addition, the pet owner may further contaminate his or her environment when disposing of the puppy pad. Also, the puppy pad must be thrown away after each use creating trash that adds to a community's trash dump.

BRIEF SUMMARY OF THE INVENTION

Embodiments of the present invention address deficiencies of the art in respect to pet waste disposal and provide a novel and non-obvious apparatus for facilitating the collection and disposal of pet waste. In an embodiment of the invention, a portable pet urine reservoir can include a housing defining a reservoir (or chamber) for collecting pet urine. The portable pet urine reservoir can further include a permeable pad and a plurality of polygonally shaped protrusions upwardly emanating from a sloping basin upon which the permeable pad is disposed atop. Of note, the polygonally shaped protrusions are of different heights to allow the permeable pad to rest approximately flat even though the basin surface is sloped. The portable pet urine reservoir may also include an aperture, through which collected urine can be emptied. The portable pet urine reservoir may also include an additional reservoir, an additional basin, and an additional aperture (or drain). The additional aperture may be positioned near a bottom portion of the sloping basin and allows urine flow between the reservoir and the additional reservoir. The portable pet urine reservoir can still further include support structure (or blow indentations) upwardly extending from the additional basin.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a portable pet urine reservoir. In accordance with an embodiment of the invention, the portable pet urine reservoir can include a housing that defines a urine collection reservoir or chamber. The housing may include a sloped basin and several protrusions upwardly emanating from the sloping basin. A permeable pad rests on top of the protrusions in such a way so that when an animal relieves itself, the animal does not stand in its own urine. The permeable pad can be washable, so it does not need to be replaced after each use, thus not contributing additional waste to a trash dump. In an embodiment, the urine travels through the permeable pad onto the sloped basin of a urine collection reservoir to a hole or drain; the urine flows through the drain and can be collected into an additional reservoir. In another embodiment, the urine can travel directly to a urine collection reservoir where an aperture or hole in the housing allows a person to drain the urine from the collection chamber; optionally, this aperture can be coupled to a valve and/or a hose to enable drainage of the urine from the reservoir for disposal. Of note, the protrusions can guide the urine to the drain. Optionally, a splash guard can fit into a gutter bordered by railings on the housing. The splash guard enables urine that comes in contact with it to travel through channels in the railing of the housing and eventually into the urine collection chamber. Of further note, support structure arising upwardly from an additional basin (in other words, from the bottom or underside of the housing) provides support to the portable pet urine reservoir so that larger animals can use the portable pet waste station without the apparatus collapsing. In addition, the support structure improves the rigidity of the portable pet urine reservoir. Of note, as the housing is rigid and has mass and height, it is more difficult for an animal to drag the unit throughout an abode. As an additional option, the portable pet urine reservoir can include an optional cover, which allows a pet owner to more easily transport and/or travel with the reservoir.

Figure 1:
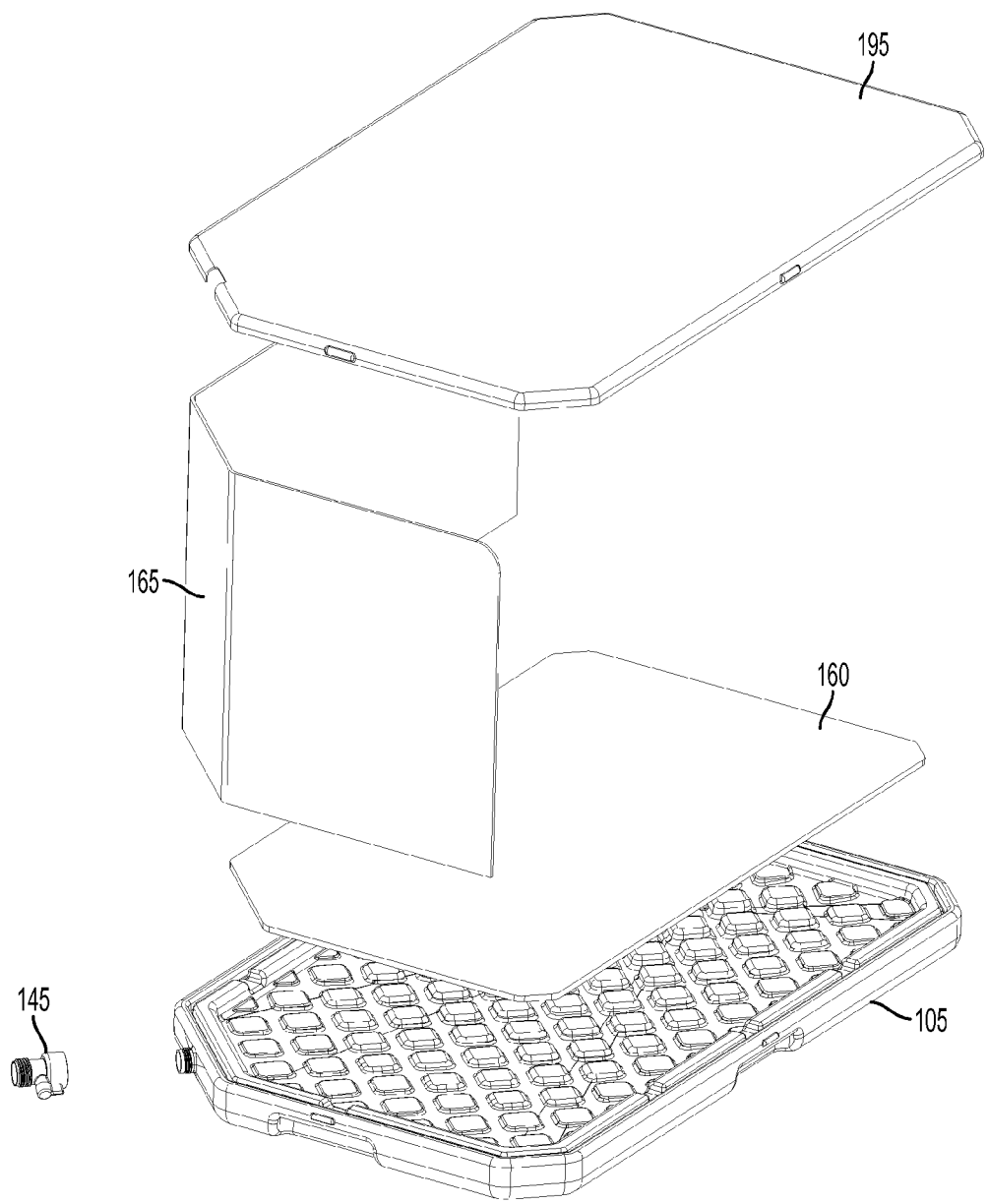
FIG. 1 is an exploded view of an embodiment of a portable pet urine reservoir.

In a more specific illustration of an embodiment, FIG. 1 shows an embodiment of a portable pet urine reservoir. A permeable pad 160 can be disposed atop of a housing 105. The housing 105 can be configured to receive a splash guard 165. A cover 195 can be used to cover the housing 105. The cover 195 can be used for travel and/or to assist (protect from spillage or splash) the human-user upon moving or emptying the unit. The splash guard 165 can be folded and laid atop the permeable pad 160 for storage or when the unit is not in use, which can then be covered by the cover 195 for easier movement. A valve 145 can be attached to the housing 105 for emptying a used portable pet urine reservoir.

Figure 2:
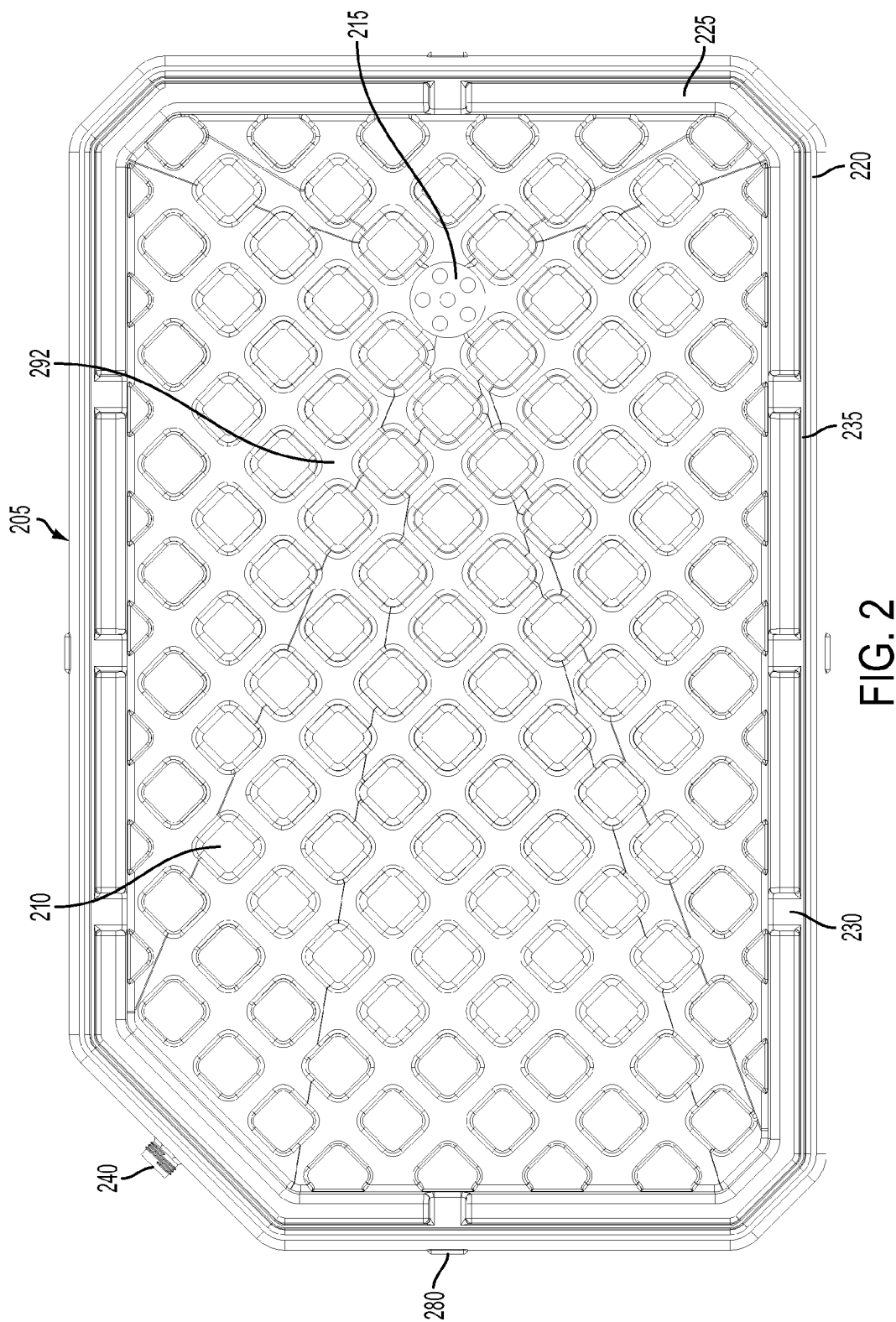
FIG. 2 is a top view of an embodiment of a portable pet urine reservoir.

In further illustration, FIG. 2 illustrates a top view of an embodiment of a portable pet urine reservoir. The portable pet urine reservoir can be defined by a tray or housing 205, which encompasses a reservoir or chamber, within which urine is collected after the urine travels down a basin 292 through a drain or an aperture 215 into an additional reservoir. In other words, the aperture 215 can permit fluid communication between different reservoirs, including the reservoir defined by the housing and the additional reservoir. The housing 205 can comprise a plurality of housing walls extending from a sloping basin 292 from one of the housing walls to another of the housing walls. The basin 292 is sloped towards the aperture 215. In other words, the basin 292 slopes from one of the housing walls to another of the housing walls in order to drive by gravity urine from a top portion of the sloping basin 292 to a bottom portion of the sloping basin 292. The degree of slope is not specifically defined, but should encourage the flow of urine to the drain 215. In one embodiment, the slope is 22%; in another embodiment it is 17%. In one embodiment, the aperture 215 can be a grate drain, but the type of drain used is not limited to a specific type. The housing 205 can be made of plastic, including but not limited to polyethylene, polyvinyl chloride (PVC), and polyethylene terephthalate. In addition, the housing 205 can be manufactured using any technique now known or later developed, including blow molding (blow forming) and injection molding. Alternatively, the housing 205 can be made of metal or any other material. The drain 215 is not limited to a specific diameter, but should allow the flow of urine through it without comprising the rigidity of the housing 205. In other words, the drain 215 can vary in size as long as its size does not compromise the ability of the housing 205 to support the weight of an animal. In one embodiment, the drain is approximately ¾ inch in diameter.

The housing 205 also includes a plurality of protrusions 210, which upwardly emanate from the sloping basin 292. Each protrusion 210 is not limited to a specific shape, but can by any approximately flat polygon shape, including diamond-shaped, approximately squared-shaped, and rectangular-shaped. The protrusions 210 can aid in guiding the urine toward the drain 215. The protrusions 215 are constructed so that urine can flow around them. In addition, the protrusions 210 vary in height so that the protrusions collectively provide a support surface of approximately uniform height to support a permeable pad. Of note, the specific height of each protrusion 210 is not defined, but should allow a permeable pad to rest approximately flat atop the protrusions 210 given that the basin 292 upon which the protrusions 210 arise is sloped. Of note, the protrusions 210 are not limited to a specific layout or pattern.

The housing 205 can further include an outer rail 220 and an inner rail 225. The outer and inner rails 220, 225 aid in keeping the urine within the housing 205. The outer and inner rails 220, 225 also border a gutter 235. The gutter 235 is configured to receive an optional splash guard (protective guard or backsplash) in such a way that the splash guard fits between the outer and inner rails 220, 225. In an embodiment, the gutter 235 is approximately 4 mm wide. The inner rail 225 contains at least one channel 230. The channel 230 directs urine from the splash guard toward the protrusions 210 and eventually to the drain 215. In addition, the channels 230 may be slightly sloped.

The housing 205 can also include an aperture 240 that permits fluid communication between the reservoir and the exterior of the housing 205. Optionally, the aperture 240 may or may not comprise threading. Also, optionally, the aperture 240 can comprise a valve so that any collected urine in the reservoir can be emptied. Also, a hose can be coupled to the aperture 240 to allow the removal of urine from the chamber. A hose can also be coupled to the valve. In one embodiment, the aperture 240 can be defined by an extrusion molded as part of the housing 205. In another embodiment, the aperture 240 defined by an extrusion as well as the valve may each be manufactured in a separate process from the housing 205 and later coupled (attached) to the housing 205 using any method now known or later developed, including plastic welding and ultrasonic welding. In one embodiment, a valve can be coupled to the extrusion defining the aperture 240 by screwing the valve onto the threads of the aperture 240 or onto threads on the extrusion. The valve can be made from any material, including rubber and polyethylene as well as any other plastic (or polymer). The extrusion 240 can be made from any material, including polyethylene and PVC. Optionally, suction cup feet for stabilizing the portable pet urine reservoir and a travel cover (both not shown) for covering the top of the reservoir can be provided.

The housing 205 can be coupled to at least one cover clip 280 to enable the optional cover to be secured to the housing 205. In other words, the housing 205 can be manufactured to include at least one cover clip 280 or "male" connector or fastener as part of the housing mold, while the cover can be manufactured to include at least one "female" connector configured to receive the "male" connector. The cover can be made of plastic, including PVC, and would be configured (sized) to fit atop the housing 205.

Figure 3:
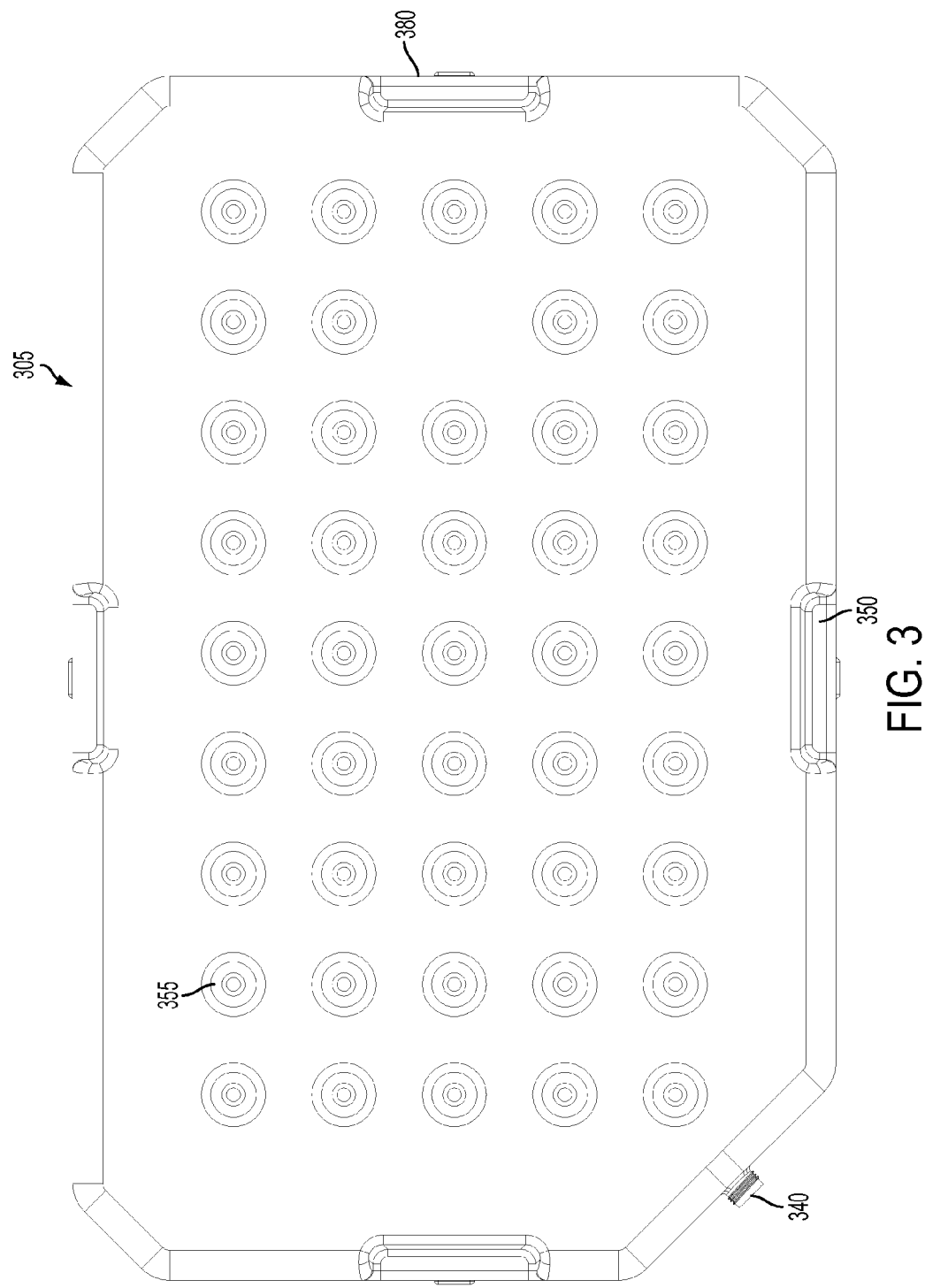
FIG. 3 is a bottom view of the portable pet urine reservoir of FIG. 2.

In further illustration, FIG. 3 is a view from the underside or bottom of the portable pet urine reservoir of FIG. 2. As shown in FIG. 3, a housing 305 having support structure 355 (internal protrusions or blow indentations) is provided. The support structure 355 can be formed by blow molding, which is also known as blow forming, or by any other manufacturing process now known or later developed. The shape and size of the support structure 355 is not specifically defined, but in one embodiment the blow indentations 355 are approximately cylindrical with a height of about 1.75 inches. In an embodiment, the support structure 355 upwardly extends from an additional basin to the opposite portion of the sloping basin. In other words, the blow indentations 355 rise from the bottom or base of the housing 305 to the sloped basin. The support structure 355 allows the housing 305 to support the weight of an animal and increases the rigidity of the housing 305. The layout of the blow indentations 355 is not specifically defined, but can be situated in any pattern that provides support to the housing 305.

Optionally, the housing 305 can include at least one handle 350. The handle 350 can be molded into the housing 305 or formed in any other way. In addition, at least one cover clip 380 can be coupled to the housing 305; the cover clip 380 can also be molded into the housing 305 or formed in any other way. The housing 305 can also define an aperture 340 which enables a user of the portable pet urine reservoir to remove (drain) any pet waste.

Figure 4:
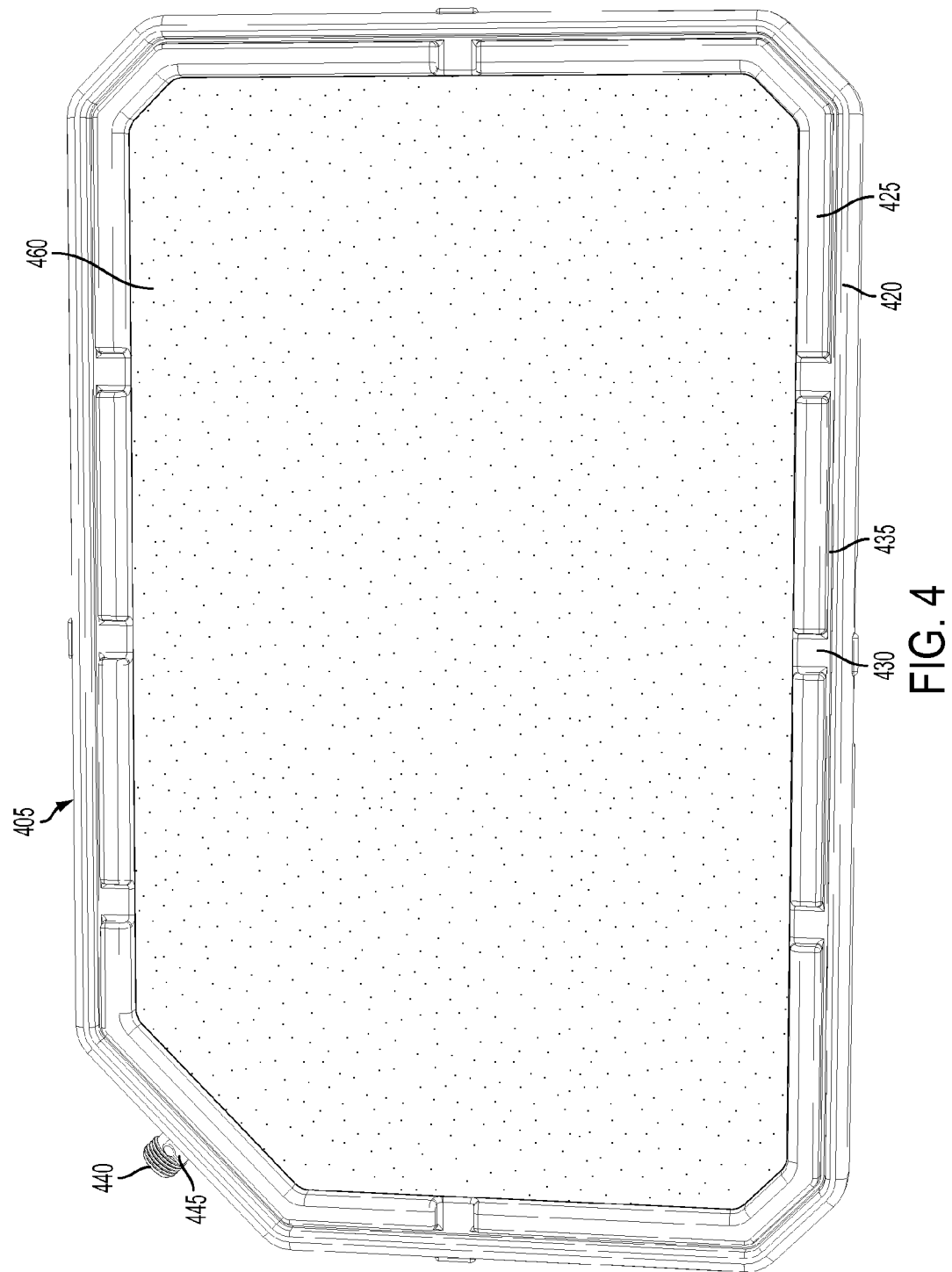
FIG. 4 is a top view of the portable pet urine reservoir of FIG. 2 configured with a permeable pad.

In further illustration, FIG. 4 is a top perspective of the portable pet urine reservoir of FIG. 2 configured with a permeable pad 460. The permeable pad 460 is porous. The permeable pad 460 can be disposable (single use or low-use and throw away) and/or washable (re-usable). The permeable pad 460 can be made from plastic, including but not limited to PVC, PVC coil, rubber, and polyethylene. Of note, the permeable pad 460 can be manufactured to resemble grass; in other words, the permeable pad can be artificial grass or artificial turf. The pad 460 may also be made from a material that is machine washable. The degree of how porous the permeable pad 460 is not specifically defined, but the permeable pad 460 needs to allow the flow of urine and other pet secretions through it and onto the basin. As indicated above, the permeable pad 460 rests on top of the support surface provided by the protrusions.

FIG. 4 further shows the outer rail 420, the inner rail 425, the channels 430 of the inner rail 425, and the gutter 435. In addition, the aperture 440 and the optional valve 445 that can be coupled to the extrusion 440 are shown. Of note, in an embodiment, if an animal defecates on the permeable pad 460, the feces remain on the surface of the permeable pad and can be removed (pick-up) in the same manner as if the animal defecated outside. In another embodiment, fecal material can pass through the permeable pad 460 and be collected in a reservoir if the permeable pad 460 is sprayed (treated) with a bio-enzyme treatment. The bio-enzyme treatment spray contains spores that activate when the spores come into contact with the ammonia in the urine. The spores neutralize the ammonia in the urine to assist in controlling odor. The bio-enzyme treatment spray also contains deo-essence to provide a more pleasing fragrance. An enzyme concentrate can also be used to prime the reservoir(s); the enzyme concentrate like the bio-enzyme treatment spray contains spores that are used to control odor by neutralizing the ammonia in urine.

Figure 5:
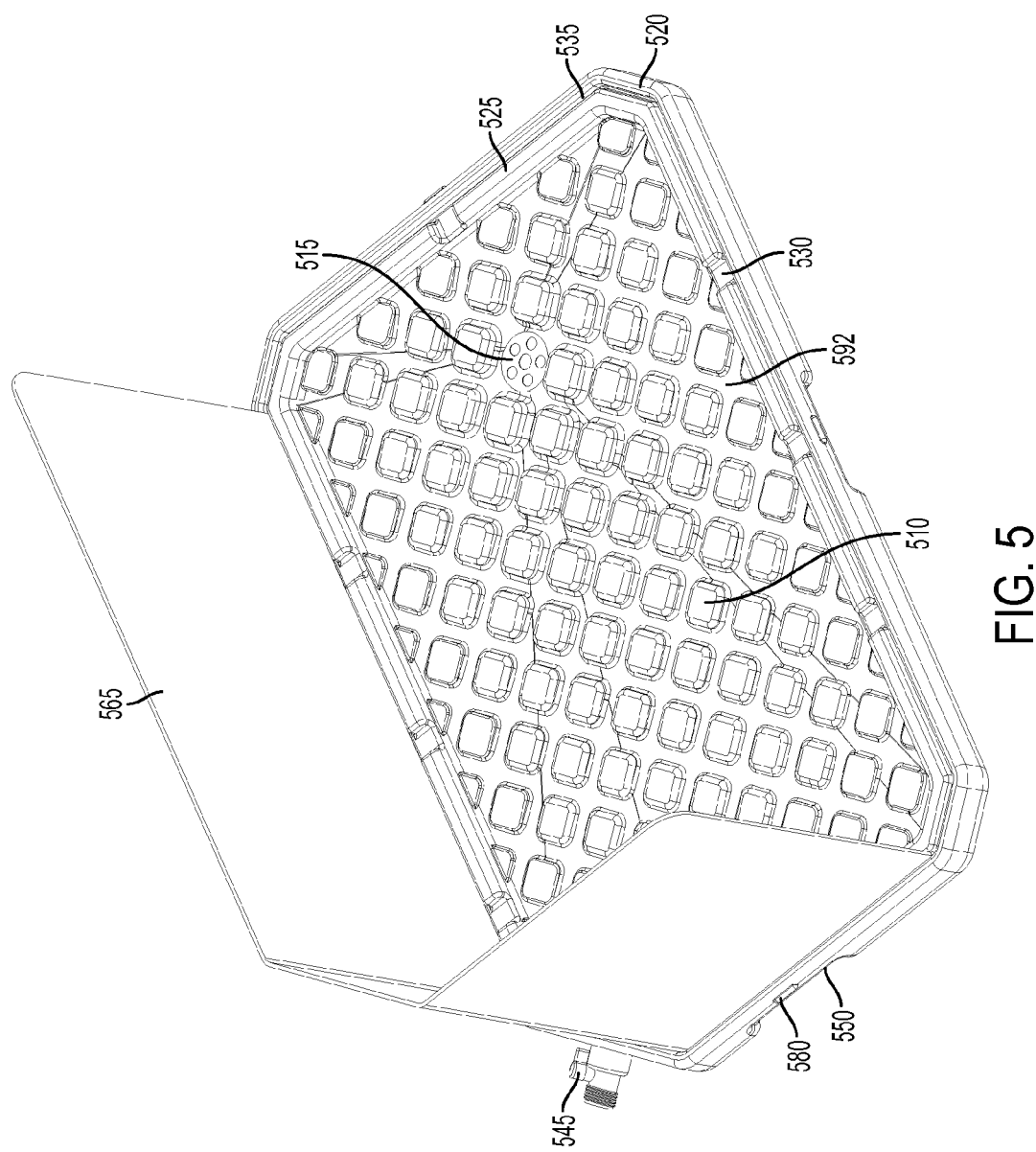
FIG. 5 illustrates the portable pet urine reservoir of FIG. 2 configured with a splash guard.

In further illustration, FIG. 5 illustrates the portable pet urine reservoir of FIG. 2 configured with a protective guard or splash guard 565 and without the permeable pad. The optional splash guard 565 can be used to limit the travel of stray urine drops during an act of urination by a pet such as a dog. The optional splash guard 565 can be made of corrugated plastic. Urine moves down the splash guard 565, where the urine eventually travels through a channel 530 onto a basin 592 past the protrusions 510 and eventually to an aperture or drain 515. The splash guard 565 does not absorb any urine and can be wiped down (cleaned) by a human-user. Of note, the splash guard 565 can include an image, which can be printed directly onto the splash guard 565. The splash guard 565 is not limited to specific dimensions or to a specific size, but in an embodiment, is approximate 39 inches long by about 18 inches high and is about 4 mm thick. In addition, the size of the splash guard 565 is designed to match the size of the housing; in other words, there can be a variety of sizes of both the housing and splash guard 565. The splash guard 565 fits into a gutter 535 and the splash guard 565 can be arranged approximately perpendicularly to a horizontal plane defined by a permeable pad. In an embodiment, the gutter is about 4 mm wide. The gutter 535 is bordered by an outer rail 520 and an inner rail 525. It is the inner rail 525 that contains channels 530.

After an animal has used the unit, a pet owner can turn an optional valve 545 in order to drain or pour the collected waste from the unit into a disposal receptacle, such as a toilet, or outside onto grass. An optional cover can make movement of a used unit easier. The cover can be attached to cover clips 580 that are coupled to the housing. In addition, handles 550 can provide a human-user a place to hold onto while moving the portable pet urine reservoir.

Figure 6:
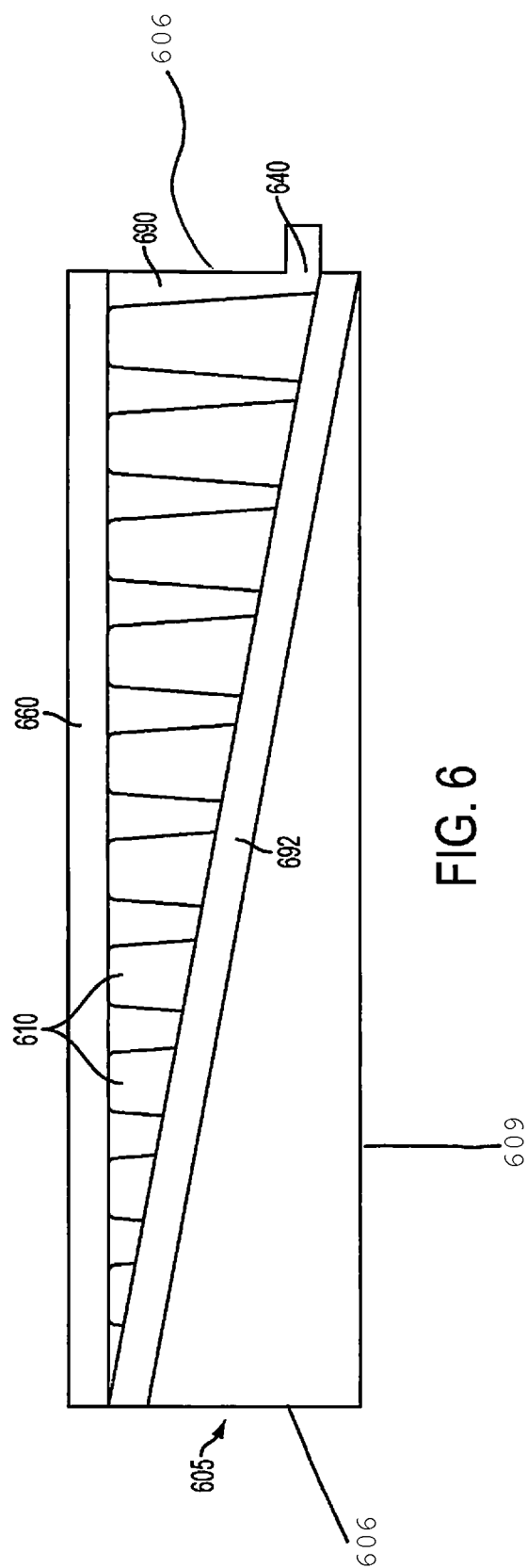
FIG. 6 illustrates another embodiment of a portable pet urine reservoir.

In further illustration, FIG. 6 is another embodiment of a portable pet urine reservoir. A housing 605 defining a reservoir 690 can be provided. The housing 605 can further include a bottom wall 609 and a plurality of sidewalls 606. After an animal urinates on a permeable pad 660, the urine flows through the permeable pad 660 onto a sloping basin 692. The sloping basin 692 drives the urine by gravity so that the urine can be collected in a reservoir 690. The collected urine can then be drained through an aperture 640 in the housing 605. The aperture 640 can be disposed in the housing 605 at a position near the bottom portion of the sloping basin 692 to permit fluid communication between the reservoir 690 and the exterior of the housing 605. Of note, the aperture 640 mayor may not comprise a valve. The permeable pad 660 can rest on a plurality of protrusions 610 of varying heights that rise vertically from the sloping basin 692. The plurality of protrusions 610 can have a thickness extending from the sloping basin 692 of the housing 605 upward toward the permeable pad 660. The thickness of the one or more of the plurality of protrusions 610 increases as the sloping basin 692 slopes downward from one sidewall 606 of the housing 605 toward a second sidewall 606 of the housing 605.

Figure 7:
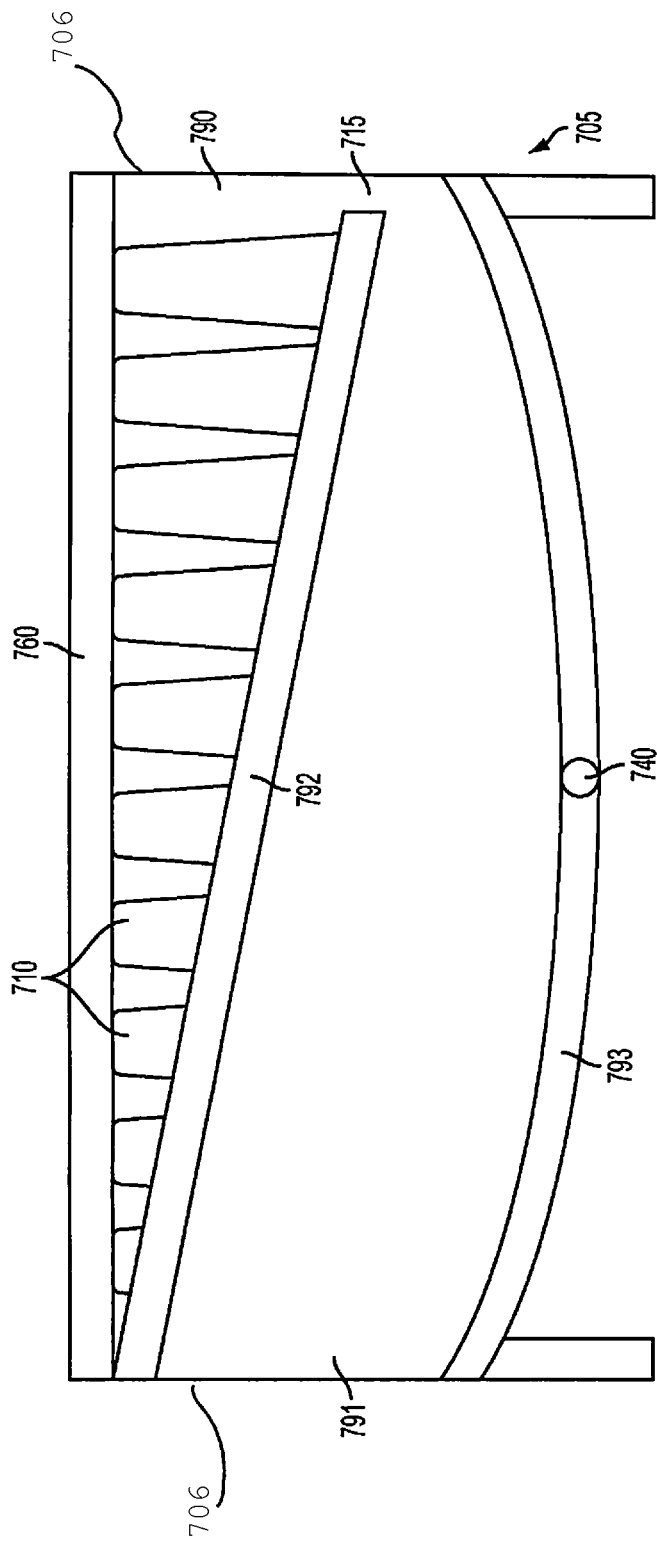
FIG. 7 illustrates a different embodiment of a portable pet urine reservoir.

In further illustration, FIG. 7 is an embodiment of a portable pet urine reservoir. A housing 705 defining a reservoir 790 can be provided. The housing 705 can further include a bottom wall or bowl shaped basin 793 and a plurality of sidewalls 706. After an animal urinates on a permeable pad 760, which rests on protrusions 710, the urine flows through the permeable pad 760 onto a sloping basin 792. The plurality of protrusions 710 can have a thickness extending from the sloping basin 792 of the housing 705 upward toward the permeable pad 760. The thickness of the one or more of the plurality of protrusions 710 increases as the sloping basin 792 slopes downward from one sidewall 706 of the housing 705 toward a second sidewall 706 of the housing 705. The urine flows along the sloping basin 792 from one reservoir 790 through a drain or aperture 715 into an additional reservoir 791. The aperture 715 can permit fluid communication between both reservoirs 790, 791. The urine can then be collected in a bowl-shaped basin 793. The urine can be removed from the bowl-shaped basin 793 through an aperture 740 that may or may not comprise a valve.

Figure 8:
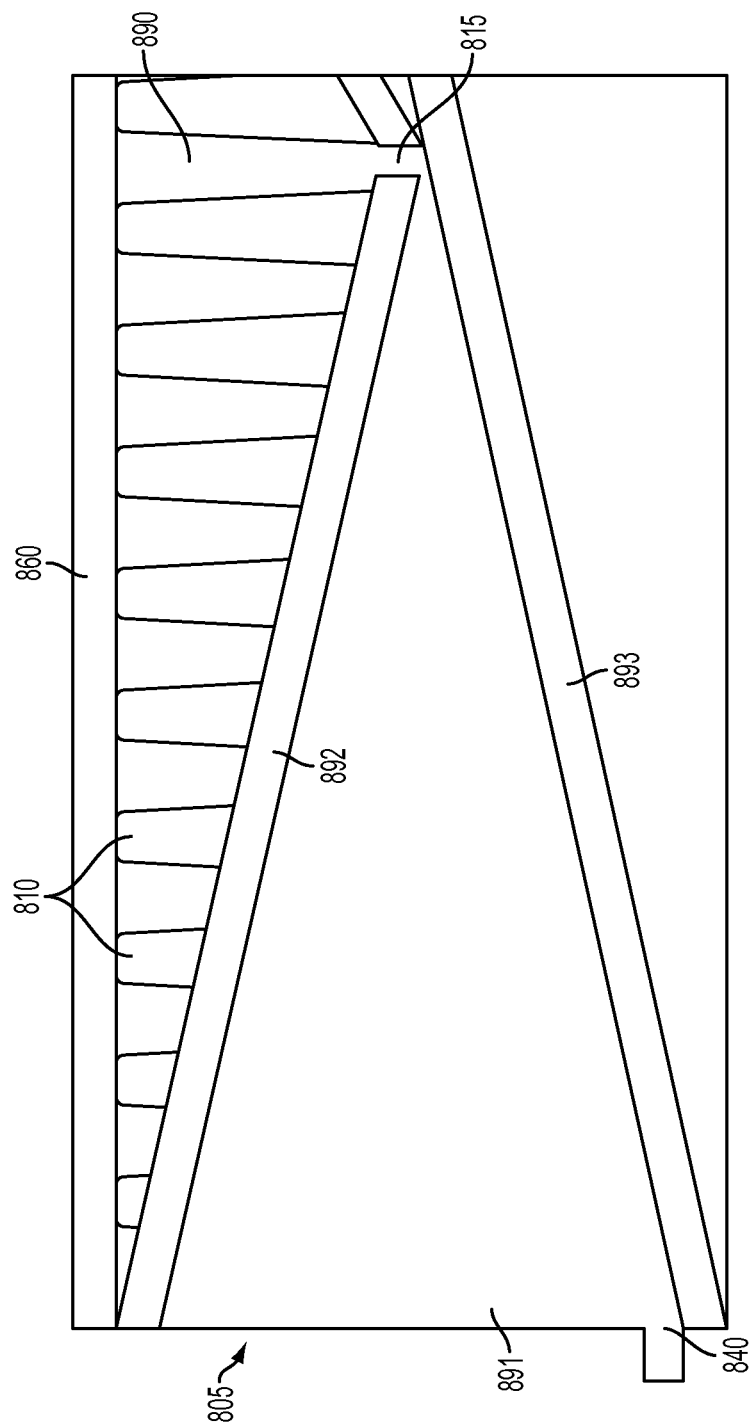
FIG. 8 illustrates an embodiment of a portable pet urine reservoir.

In further illustration, FIG. 8 is a different embodiment of a portable pet urine reservoir. A housing 805 defining a reservoir 890 can be provided. After an animal urinates on a permeable pad 860, the urine flows through the permeable pad 860 onto a sloping basin 892. Of note, the permeable pad 860 is disposed atop a plurality of protrusions 810 that upwardly emanate from the sloping basin 892. Of further note, the protrusions 810 provide a support surface of uniform height. The urine travels along the sloping basin 892 from one reservoir 890 through an aperture 815 into an additional reservoir 891 where the urine can further flows along an additional sloping basin 893. The collected urine can be removed from the portable pet urine reservoir through another aperture 840 that permits fluid communication between the additional reservoir 891 and the exterior of the housing 805. Of note, the additional basin 893 can slope downwardly from a portion of the basin 892 nearest to the aperture 815 permitting fluid communication between the reservoir 890 defined by the housing 805 and the additional reservoir 891 to the aperture 840 disposed in the housing 805. Of further note, the aperture 840 may or may not be comprised of a valve.

Figure 9:
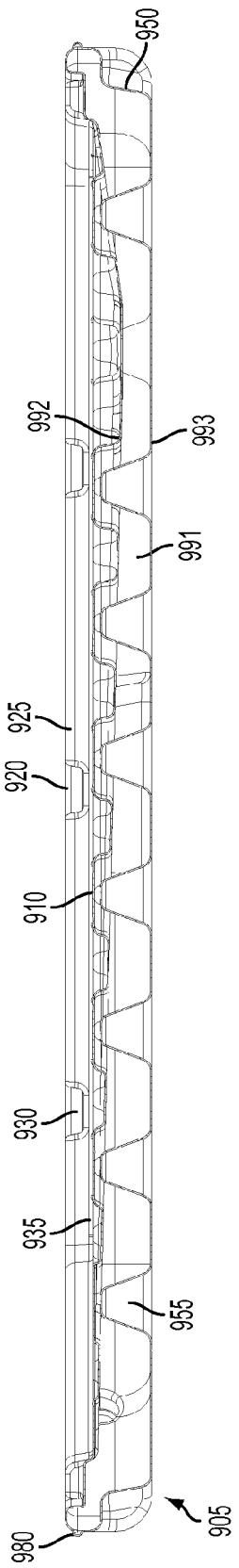
FIG. 9 illustrates a cross section of a front view showing the portable pet urine reservoir of FIG. 1 configured without a permeable pad; and, FIG. 10 illustrates another embodiment of a portable pet urine reservoir.

In further illustration, FIG. 9 is a cross section of a front view of an embodiment of a portable pet urine reservoir configured without a permeable pad. A housing 905 can define two reservoirs, two basins, and two apertures where urine is collected in the additional reservoir 991 after it flows along a basin 992 through a drain (or aperture). Support structure 955 can be provided and upwardly extends from the additional basin 993 to the opposite portion of the sloping basin 992, which is approximately 1.75 inches in height. The blow indentations 955 assist in supporting the top or surface of the unit (the housing 905), and thus, also aids in supporting the weight of an animal. Of note, each support structure (or blow indentation) 955 define a cavity that extends upward toward the sloping basin.

Protrusions 910, of different heights, allow a permeable pad disposed on top of the protrusions 910 to rest approximately flat even though the basin 992 is sloped. Optionally, a splash guard is configured to fit in the gutter 935, which is bordered by the outer rail 920 and the inner rail 925, which contains channels 930. Defined by the housing 905 is an opening (or aperture) which can be coupled to an extrusion, from which the collected urine can be drained. The extrusion can be coupled to an optional valve. The optional valve can also be coupled to a hose. At least one cover clip 980 can also be coupled to the housing 905. In addition, handles 950 can also be provided.

Figure 10:
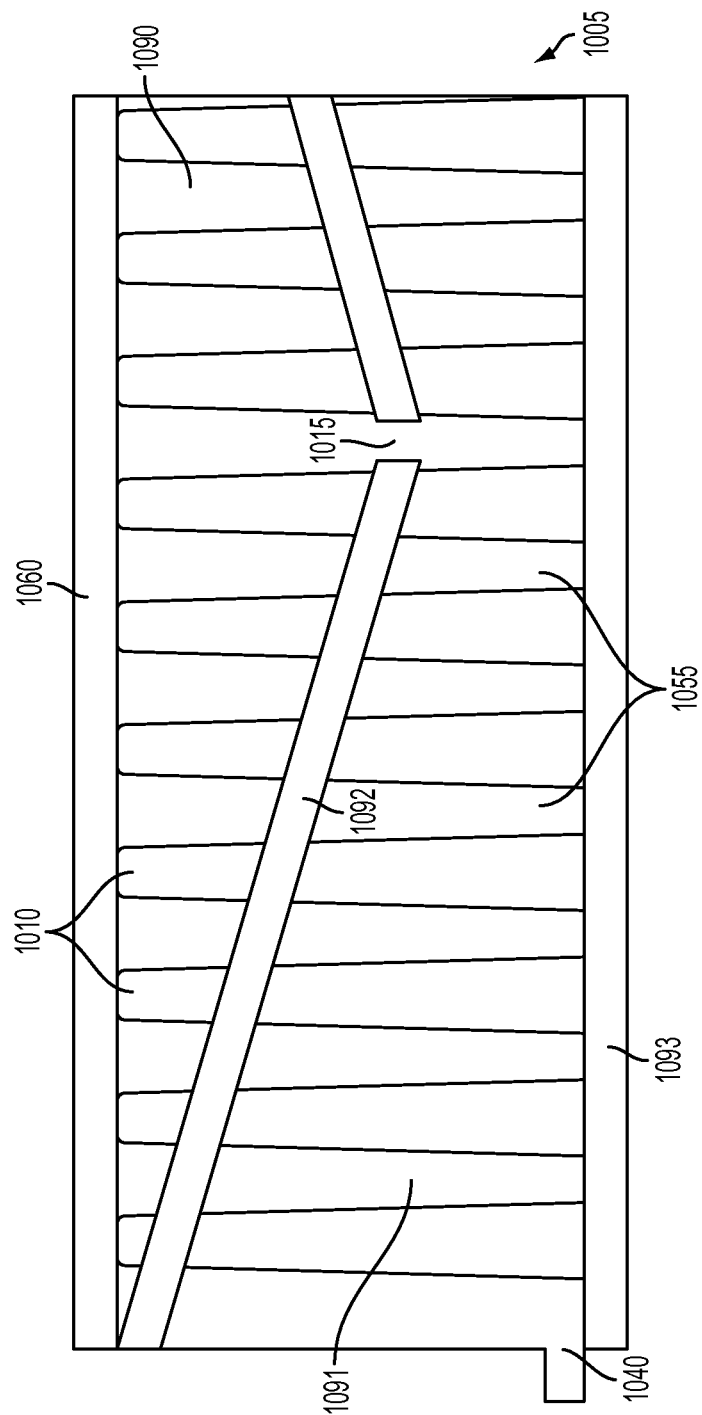

In further illustration, FIG. 10 is another embodiment of a portable pet urine reservoir. A permeable pad 1060 rests on top a support surface formed from a plurality of protrusions 1010. Urine can flow through the permeable pad 1060 down along a sloped basin 1092 and around the protrusions 1010 from one reservoir 1090 through an aperture 1015 into an additional reservoir 1091. Urine can then be emptied through a different aperture 1040, which may or may not be coupled to a valve, after it is collected in the additional reservoir 1091. Of note, an approximately horizontal (not sloped) additional basin 1093 can serve as the base or bottom of the additional reservoir 1091. Support structure 1055 rising from the additional basin 1093 (the approximate bottom of the housing 1005) to the sloped basin 1092 can provide additional strength and support to the housing 1005.

As illustrated in the drawings, specifically with respect to FIGS. 7 through 10, several different embodiments of a portable urine reservoir can include a reservoir 790, 890, 1090; a plurality of polygonally shaped protrusions 710, 810, 910, 1010 (as more clearly illustrated in FIG. 2); a permeable pad 760, 860, 1060 resting on top of the support surface provided by the plurality of protrusions 710, 810, 910, 1010; and an aperture 740, 840, 1040 for which collected urine can be emptied as well as an additional reservoir 791, 891, 991, 1091 with an additional basin 793, 893, 993, 1093 and an additional aperture 715, 815, 1015. The additional aperture 725, 815, 1015 permits fluid communication between both reservoirs 790, 791; 890, 891; 1090, 1091. Of further note, the additional basin 793, 893, 993, 1093, can be shaped like a bowl as shown in FIG. 7, not sloped as in FIGS. 9 and 10, or sloped as in FIG. 8. Of even further note, in an embodiment where the additional basin 893 is sloped, the additional basin 893 can slope downwardly from a portion of the additional basin 893 nearest the additional aperture 815 permitting fluid communication between the reservoir 890 and the additional reservoir 891 to the aperture 840 disposed in the housing 805.

In addition, as illustrated in the drawings, specifically with respect to FIGS. 7 through 10, several different embodiments of a portable urine reservoir can include a housing 705, 805, 905, 1005 defining a reservoir 790, 890, 990, 1090 comprising a plurality of housing walls extending from a basin 792, 892, 992, 1092 sloping from one of the housing walls to another of the housing walls in order to drive by gravity urine from a top portion of the sloping basin 792, 892, 992, 1092 to a bottom portion of the sloping basin 792, 892, 992, 1092. The portable urine reservoir can further include a plurality of polygonally shaped protrusions 710, 810, 910, 1010 upwardly emanating from the sloping basin 792, 892, 992, 1092. The protrusions 710, 810, 910, 1010 collectively provide a support surface of uniform height to support a permeable pad 760, 860, 1060; the permeable pad 760, 860, 1060 rests on top of the support surface. In addition, the portable urine reservoir can even further include a first aperture 715, 815, 1015 at a position near the bottom of the sloping basin 792, 892, 992, 1092, which permits fluid communication between the reservoir 790, 890, 990, 1090 and an additional reservoir 791, 891, 991, 1091 and a second aperture 740, 840, 940, 1040 disposed in the housing 705, 805, 905, 1005 through which collected urine in the additional reservoir 791, 891, 991, 1091 can be emptied.

Further, as illustrated in the drawings, specifically with respect to FIGS. 9 and 10, a portable urine reservoir can include a housing 905, 1005 defining a first reservoir 1090 with a sloping basin 992, 1092 and a second reservoir 991, 1091 with a second basin 993, 1093. The first reservoir 1090 is positioned above the second reservoir 991, 1091. The portable urine reservoir can further include a plurality of blow indentations 955, 1055; the plurality of blow indentations 955, 1055 extend from a bottom of the second basin 993, 1093. The portable urine reservoir can even further include a plurality of polygonally shaped protrusions 910, 1010 upwardly emanating from the sloping basin 992, 1092. In addition, the protrusions 910, 1010 collectively provide a support surface of uniform height to support a permeable pad 1060 and the permeable pad 1060 can rest on top of the support surface. Further, the portable urine reservoir can include a first aperture 1015 at a position near a bottom portion of the sloping basin 992, 1092, which permits fluid communication between the first reservoir 1090 and the second reservoir 991, 1091. In addition, the portable urine reservoir can include a second aperture 1040 at a position near a bottom portion of the second basin 993, 1093 through which collected urine in the second reservoir 991, 1091 can be emptied. As shown specifically in FIGS. 2 and 9, in a portable urine reservoir the housing 205, 905 can further comprise a gutter 235, 935, where a bottom edge of a splash guard (see FIGS. 1 and 5, for example of a splash guard), and the housing 205, 905 can further include a plurality of channels 230, 930.

As will be appreciated by one skilled in the art, aspects of the present invention may be embodied as a system, method, or apparatus. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A portable pet urine reservoir comprising:
a sloping basin sloping downwardly from a first sidewall of the housing toward a second sidewall of the housing in order to drive by gravity urine from a top portion of the sloping basin to a bottom portion of the sloping basin;
a plurality of polygonally shaped protrusions upwardly emanating from the sloping basin, the plurality of polygonally shaped protrusions, each polygonally shaped protrusions having a thickness extending from the sloping basin of the housing toward the permeable pad, the thickness of one or more of the plurality of polygonally shaped protrusions increases as the sloping basin slopes downward from the first sidewall of the housing toward the second sidewall of the housing, so that each of the plurality of polygonally shaped protrusions collectively provide a support surface of uniform height to support the permeable pad, the permeable pad resting on top of the support surface;
a first aperture at aposition near the bottom portion of the sloping basin which permits fluid communication between the reservoir and an additional reservoir; and,
a second aperture disposed in the housing through which collected urine in the additional reservoir can be emptied.

2. The portable urine reservoir of claim 1, wherein the aperture permits fluid communication between the reservoir and the exterior of the housing.

3. The portable urine reservoir of claim 1, further comprising:
an additional reservoir with an additional basin and an additional aperture at a position near the bottom portion of the sloping basin, the additional aperture permits fluid communication between the reservoir and the additional reservoir.

4. The portable urine reservoir of claim 1, further comprising:
at least two support structures upwardly extending from an additional basin toward the sloping basin 5. The portable urine reservoir of claim 1, wherein the aperture comprises a valve.

6. The portable urine reservoir of claim 3, wherein the additional basin slopes downwardly from a portion of the additional basin nearest to the additional aperture permitting fluid communication between the reservoir and the additional reservoir to the aperture disposed in the housing.

7. The portable urine reservoir of claim 3, wherein the additional basin is shaped like a bowl.

8. The portable urine reservoir of claim 3, wherein the additional basin is not sloped.

9. The portable urine reservoir of claim 1, wherein a top portion of each of the plurality of polygonally shaped protrusions is a flat polygon.

10. The portable pet urine reservoir of claim 1, further comprising:
a cover configured to fit atop the housing.

11. The portable pet urine reservoir of claim 1, further comprising:
a splash guard coupled to the housing.

12. The portable pet urine reservoir of claim 1, wherein the housing further comprises:
an outer rail;
an inner rail having at least one channel; and,
a gutter between the outer rail and the inner rail.

13. The portable pet urine reservoir of claim 12, wherein the gutter is configured to receive a splash guard.

14. The portable pet urine reservoir of claim 1, wherein the housing further comprises:
at least one handle.

15. The portable pet urine reservoir of claim 1, wherein the housing further comprises:
at least one cover clip.

16. A portable pet urine reservoir comprising:
a housing defining a reservoir for collecting pet urine, the housing comprising a bottom wall and a plurality of sidewalls extending upward from the bottom wall toward a permeable pad;
toward a permeable pad, the sloping basing sloping downwardly from a first sidewall of the housing toward a second sidewall of the housing;
a plurality of blow indentations, the plurality of blow indentations extending upward from a bottom of the second basin toward the sloping basin;
a plurality of polygonally shaped protrusions upwardly emanating from the sloping basin, the plurality of polygonally shaped protrusions, each polygonally shaped protrusions having a thickness extending upward from the sloping basin of the housing toward the permeable pad, the thickness of one or more of the plurality of polygonally shaped protrusions increases as the sloping basin slopes downward from the first sidewall of the housing toward the second sidewall of the housing, each of the plurality of polygonally shaped protrusions collectively provide a support surface of uniform height to support the permeable pad, the permeable pad resting on top of the support surface;

a first aperture at a position near a bottom portion of the sloping basin which permits fluid communication between the first reservoir and the second reservoir; and, a second aperture at a position near a bottom portion of the second basin through which collected urine in the second reservoir can be emptied.

17. A portable pet urine reservoir comprising:

a housing defining a first reservoir with a sloping basin and a second reservoir with a second basin, the first reservoir positioned above the second reservoir, the housing comprising a bottom wall and a plurality of sidewalls extending upward from the bottom wall a housing defining a reservoir for collecting pet urine, the housing comprising a bottom wall and a plurality of sidewalls extending upward from the bottom wall toward a permeable pad;

a sloping basin, sloping downwardly from a first sidewall of the housing toward a second sidewall of the housing;

a plurality of polygonally shaped protrusions upwardly emanating from the sloping basin, the plurality of polygonally shaped protrusions, each polygonally shaped protrusions having a thickness extending from the sloping basin of the housing toward the permeable pad, the thickness of one or more of the plurality of polygonally shaped protrusions increases as the sloping basin slopes downward from the first sidewall of the housing toward the second sidewall of the housing, the permeable pad resting on top of the plurality of polygonally shaped protrusions; and, an aperture disposed in the housing through which collected urine in the reservoir can be emptied.

18. The portable pet urine reservoir of claim 17, wherein the housing further comprises a gutter.

19. The portable pet urine reservoir of claim 18, wherein a bottom edge of a splash guard is disposed in the gutter.

20. The portable pet urine reservoir of claim 17, wherein the housing further comprises a plurality of channels.

* * * * *

UNITED STATES PATENT AND TRADEMARK OFFICE
CERTIFICATE OF CORRECTION

PATENT NO. : 8,776,726 B2
APPLICATION NO. : 13/158389
DATED : July 15, 2014
INVENTOR(S) : Kathleen T. Hillman It is certified that error appears in the above-identified patent and that said Letters Patent is hereby corrected as shown below:

In the Claims

Column 9, line 47, cancel the text beginning with "1. A portable pet urine reservoir" and with ending "additional reservoir can be emptied." at column 10, line 3, and insert the following claim:

--1.    A portable pet urine reservoir comprising:
        a housing defining a reservoir for collecting pet urine, the housing comprising a bottom wall and a plurality of sidewalls extending upward from the bottom wall toward a permeable pad;
        a sloping basin, sloping downwardly from a first sidewall of the housing toward a second sidewall of the housing;
        a plurality of polygonally shaped protrusions upwardly emanating from the sloping basin, the plurality of polygonally shaped protrusions, each polygonally shaped protrusions having a thickness extending from the sloping basin of the housing toward the permeable pad, the thickness of one or more of the plurality of polygonally shaped protrusions increases as the sloping basin slopes downward from the first sidewall of the housing toward the second sidewall of the housing, the permeable pad resting on top of the plurality of polygonally shaped protrusions; and,
        an aperture disposed in the housing through which collected urine in the reservoir can be emptied.--

Column 10, line 51, cancel the text beginning with "16. A portable pet urine reservoir" and ending with "second reservoir can be emptied." at column 11, line 13, and insert the following claim:

--16.   A portable pet urine reservoir comprising:
        a housing defining a reservoir for collecting pet urine, the housing comprising a bottom wall and a plurality of sidewalls extending upward from the bottom wall toward a permeable pad;
        a sloping basin sloping downwardly from a first sidewall of the housing toward a second sidewall of the housing in order to drive by gravity urine from a top portion of the sloping basin to a bottom portion of the sloping basin;

Signed and Sealed this
Seventeenth Day of May, 2016

Michelle K. Lee
*Director of the United States Patent and Trademark Office* a plurality of polygonally shaped protrusions upwardly emanating from the sloping basin, the plurality of polygonally shaped protrusions, each polygonally shaped protrusions having a thickness extending from the sloping basin of the housing toward the permeable pad, the thickness of one or more of the plurality of polygonally shaped protrusions increases as the sloping basin slopes downward from the first sidewall of the housing toward the second sidewall of the housing, so that each of the plurality of polygonally shaped protrusions collectively provide a support surface of uniform height to support the permeable pad, the permeable pad resting on top of the support surface;

a first aperture at a position near the bottom portion of the sloping basin which permits fluid communication between the reservoir and an additional reservoir; and, a second aperture disposed in the housing through which collected urine in the additional reservoir can be emptied.--

Column 11, line 14, cancel the text beginning with "17. A portable pet urine reservoir" and ending with "the reservoir can be emptied." at column 12, line 16, and insert the following claim:

--17. A portable pet urine reservoir comprising:

a housing defining a first reservoir with a sloping basin and a second reservoir with a second basin, the first reservoir positioned above the second reservoir, the housing comprising a bottom wall and a plurality of sidewalls extending upward from the bottom wall toward a permeable pad, the sloping basing sloping downwardly from a first sidewall of the housing toward a second sidewall of the housing;

a plurality of blow indentations, the plurality of blow indentations extending upward from a bottom of the second basin toward the sloping basin;

a plurality of polygonally shaped protrusions upwardly emanating from the sloping basin, the plurality of polygonally shaped protrusions, each polygonally shaped protrusions having a thickness extending upward from the sloping basin of the housing toward the permeable pad, the thickness of one or more of the plurality of polygonally shaped protrusions increases as the sloping basin slopes downward from the first sidewall of the housing toward the second sidewall of the housing, each of the plurality of polygonally shaped protrusions collectively provide a support surface of uniform height to support the permeable pad, the permeable pad resting on top of the support surface;

a first aperture at a position near a bottom portion of the sloping basin which permits fluid communication between the first reservoir and the second reservoir; and, a second aperture at a position near a bottom portion of the second basin through which collected urine in the second reservoir can be emptied.--